(12) United States Patent
Puton

(10) Patent No.: US 9,118,562 B2
(45) Date of Patent: Aug. 25, 2015

(54) METHOD AND DEVICE FOR GENERATING THE CLOCK OF THE OUTPUT STREAM FROM THE INPUT STREAM

(75) Inventor: Matthieu Puton, Rennes (FR)

(73) Assignee: ENENSYS TECHNOLOGIES, Rennes (FR)

( * ) Notice: Subject to any disclaimer, the term of this patent is extended or adjusted under 35 U.S.C. 154(b) by 340 days.

(21) Appl. No.: 13/375,003

(22) PCT Filed: May 28, 2010

(86) PCT No.: PCT/EP2010/057399
§ 371 (c)(1),
(2), (4) Date: Feb. 27, 2012

(87) PCT Pub. No.: WO2010/136557
PCT Pub. Date: Dec. 2, 2010

(65) Prior Publication Data
US 2012/0155270 A1    Jun. 21, 2012

(30) Foreign Application Priority Data

May 29, 2009    (FR) .................................... 09 53549

(51) Int. Cl.
*H04L 12/815*    (2013.01)
*H04L 12/801*    (2013.01)

(52) U.S. Cl.
CPC ............... *H04L 47/10* (2013.01); *H04L 47/22* (2013.01)

(58) Field of Classification Search
CPC ........ H04L 47/10; H04L 47/22; H04L 47/225

USPC .......................... 370/229–235, 350, 503–516
See application file for complete search history.

(56) References Cited

U.S. PATENT DOCUMENTS

| 6,937,568 B1 * | 8/2005 | Nicholl et al. ................ 370/236 |
| 2003/0067872 A1 * | 4/2003 | Harrell et al. ................. 370/229 |
| 2010/0020823 A1 * | 1/2010 | Bai et al. ....................... 370/468 |

FOREIGN PATENT DOCUMENTS

WO    WO 02/01801    1/2002

OTHER PUBLICATIONS

International Search Report for PCT/EP2010/057399 mailed Sep. 21, 2010.
Foreign-language Written Opinion for PCT/EP2010/057399 mailed Sep. 21, 2010.

(Continued)

*Primary Examiner* — Pao Sinkantarakorn
(74) *Attorney, Agent, or Firm* — Nixon & Vanderhye, PC

(57) ABSTRACT

The present invention relates to the field of video stream transport. The invention specifically relates to a method for generating a clock signal controlling the transmission rate of an output signal device transmitting a stream from an input stream.
The invention describes a method for generating the clock of the output stream from a measurement of the clock of the input stream. Said measurement is permanently adjusted in order to increase the accuracy of the measurement as well as to monitor possible drifts of the input stream clock. Said decorrelation between the clock of the input stream generates a regular output clock, even when the clock of the input stream is irregular.

6 Claims, 4 Drawing Sheets

(56) References Cited

OTHER PUBLICATIONS

Liziz Zhang, "VirtualClock: A New Traffic Control Algorithm for Packet Switching Networks", Computer Communication Review, ACM, New York, vol. 2, No. 4, Sep. 1, 1990, pp. 19-29.

Chunhua Hu, et al., "A Protocol Independent Policer and Shaper Design Using Virtual Scheduling Algorithm", Communications, Circuits and Systems and West Sino Expositions, International Conference, Jun. 29-Jul. 1, 2002, IEEE, vol. 1, Jun. 29, 2002, pp. 791-795.

* cited by examiner

METHOD AND DEVICE FOR GENERATING THE CLOCK OF THE OUTPUT STREAM FROM THE INPUT STREAM

This application is the U.S. national phase of International Application No. PCT/EP2010/057399 filed 28 May 2010 which designated the U.S. and claims priority to FR 09/53549 filed 29 May 2009, the entire contents of each of which are hereby incorporated by reference.

The present invention concerns the field of video stream transport. It concerns more precisely a method for generating the clock signal managing the transmission rate of an output stream by an apparatus transmitting a stream issuing from an input stream. The streams typically being streams of the MPEG (Moving Picture Experts Group) type as defined in the document ISO/CEI 13818-1. In the context of the invention, these streams are transported on links conforming to the ASI (Asynchronous Serial Interface) standard.

The architecture for distributing video transport streams, referred to as TS streams, comprises appliances that receive one or more TS streams as an input and generate at least one stream as an output. Such appliances may have various functions. Appliances can be cited that receive several duplicated copies of the same stream and retransmit one of these streams as an output. These appliances are used in the context of making a distribution network reliable. The various copies are then broadcast by different networks and, if one of the copies suffers a transport problem on one of the networks, the appliance switches to another input to make it possible to generate a reliable output stream as long as at least one of the inputs supplies a copy of the stream. It may also be a case of an appliance for choosing one of the input streams in order to retransmit it as an output. In general terms, it is a case of any appliance that receives at least one stream as an input and retransmits it as an output. The stream may optionally undergo processing between the input and the output.

The reliable functioning of these appliances requires fine management of the transmission rates. The exact rates of the streams sent are typically not known. When the output rate of the appliance diverges, even by very little, from the rate of the stream received as an input, the result is a drift leading fatally to overflow or famine of the buffer of the appliance and therefore to a service interruption.

To solve this problem, direct use of the data received in order to generate the output stream is known. The clock generating the output stream is then slaved to the reception clock. The clock of a stream, in reception or sending, is defined as the series of moments of reception or sending of a data package of the stream. This definition is illustrated by FIG. 1. In this figure, a diagram representing the reception or sending of data can be seen on the curve in FIG 1a. Each object 1.1 represents sent or received data belonging to the stream. These data 1.1 may represent TS packets or bytes according to circumstances. FIG. 1b illustrates the clock of the stream having the temporal succession of the moments 1.2 of start of reception or sending of the data 1.1.

In this case, where it is a question of an MPEG TS stream, these streams being formed from packets referred to as TS packets, each packet typically comprising 188 bytes, the packet clock corresponding to the temporal sequence of the moments of reception or sending of a TS packet and the byte clock corresponding to the temporal series of the moments of reception or sending of a byte are distinguished.

If copying the input clock makes it possible to respond to the risk of drift of the clock of the output stream with respect to the clock of the input stream, there are cases where this clock of the output stream will experience irregularities. In particular when there is a switching between two input streams that risk not being perfectly in phase.

According to the known regulation methods, there is either a rapid convergence of the transmission rate at the startup of the system but at the cost of low precision, or a slow convergence of the rate.

The invention aims to solve the above problems by a method of generating the clock of the output stream from a measurement of the clock of the input stream. This measurement is continuously adjusted in order to increase the precision of the measurement and to monitor any drifts in the clock of the input stream. This decorrelation between the clock of the input stream and the clock of the output stream makes it possible to generate a regular output clock even in the case of irregularities on the clock of the input stream. The invention also offers the advantage of quickly converging towards a precise rate value.

The invention concerns a method of generating a clock of the moments of sending data packets of a data stream sent by a device, said device receiving at least one first input data stream and sending an output data stream, which comprises a step of measuring the rate of the input stream; a step of generating the moments of sending of the data packets of the sent stream from the input rate measured so as to comply with a sending rate corresponding to the rate of the input stream and where the step of measuring the rate of the input stream is performed continuously on the whole of the data received.

According to a particular embodiment of the invention, the step of measuring the rate of the input stream is performed by accumulation in two counters; a first counter accumulates the quantity of data received, the second counter accumulates the time elapsed for receiving these data.

According to a particular embodiment of the invention, the input stream being composed of data packets themselves composed of bytes, said counters are updated when the first byte of a data packet is received.

According to a particular embodiment of the invention, the method comprises a step of generating the moment of sending of a packet when the quantity of data sent during the sending time becomes less than the quantity of data received during the reception time.

According to a particular embodiment of the invention, the step of generating the moment of sending of a packet comprises a step of comparing two counters, a first counter accumulating the number of bytes received multiplied by the sending time, a second counter accumulating the number of bytes sent multiplied by the reception time.

The invention also concerns a device receiving at least one first input data stream and sending an output data stream, comprising means of generating a clock of the moments of sending of data packets of a data stream sent by a device, which comprises means of measuring the rate of the input stream; means of generating moments of sending data packets of the stream sent from the input rate measured so as to comply with a sending rate corresponding to the rate of the input stream and where the means of measuring the rate of the input stream perform the calculation continuously on all the data received.

The features of the invention mentioned above, as well as others, will emerge more clearly from a reading of the following description of an example embodiment, said description being given in relation to the accompanying drawings, among which:

We have seen that a TS stream is composed of data packets referred to as TS packets and composed typically of 188 bytes. The transport of such a stream on a ASI link can take place according to two distinct transmission modes, a so-called burst mode and a so-called continuous mode, sometimes also referred to as packet mode or raw data mode. We will adopt the expression "continuous". FIG. 2 illustrates these two modes. The transport stream is transmitted at a rate lower than the maximum rate enabled by the ASI link. Because of this, the data transmission is interleaved with moments without transmission in order to comply with the stream rate. The two modes are distinguished by the way in which these moments are interleaved without transmission of useful data of the stream.

Figure 1A:
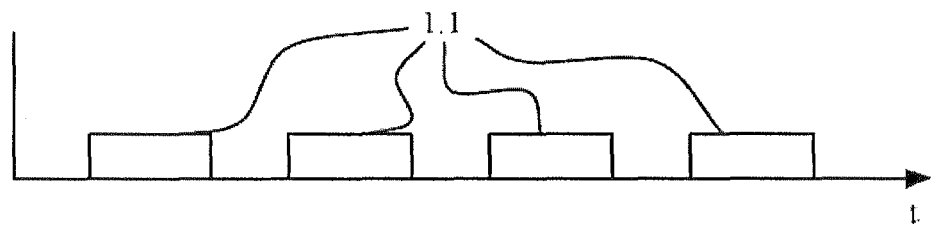
FIG. 1 illustrates the principle of a stream clock.
Figure 1B:
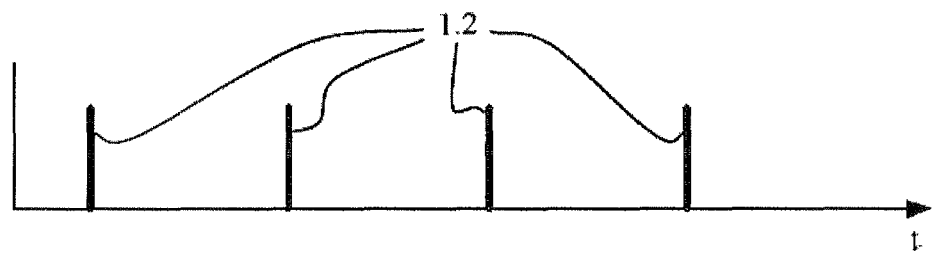
Figure 2A:
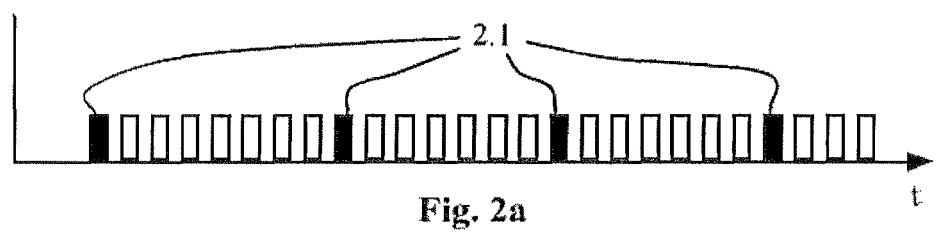
FIG. 2 illustrates the two transmission modes of a TS stream on ASI.

The first so-called continuous mode is illustrated in FIG. 2a. In this mode, the bytes making up the TS packets are substantially equally distributed in time in the stream. The first byte 2.1 of each TS packet is illustrated in black. The moments without transmission are inserted between each data byte independently of the position of the byte within the TS packet.

Figure 2B:
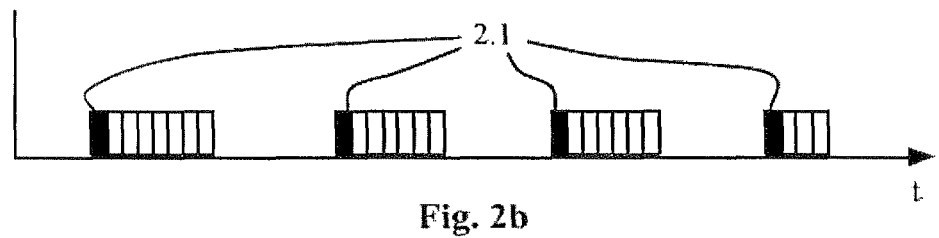

The second so-called burst mode is illustrated in FIG. 2b. In this mode, the bytes making up a TS packet are sent successively one after the other. The moments without transmission are therefore inserted solely between the last byte of a TS packet and a first byte of the following TS packet. In this figure, the first bytes of each TS packet have also been marked in black. It should be noted that the TS packets are typically composed of 188 bytes, which are not all shown in the figure for reasons of clarity.

When the two modes are compared, it can be seen that the packet clock of the stream is substantially the same in the two modes. On the other hand, the byte clock is different. In continuous mode, the byte clock is substantially regular, while the packet clock has a grouping per TS packet of the moments of sending or reception of the bytes.

One of the problems also addressed by the invention is the change in transmission mode between the received stream and the stream sent as an output. When it is wished to change mode, in particular when a stream transmitted in burst mode is received and it is wished to send the output stream in continuous mode, it is necessary to generate the byte clock of the output stream in order to control the sending of the bytes at the correct rate. This clock cannot be deduced by simply copying a clock of the stream received.

The method proposed affords a continuously refining measurement of the rate of the stream received. This measurement is used to generate a byte clock of the output stream. This clock is very precise because the measurement of the input stream is refined continuously. In the case of drift in the input rate, the clock of the output stream is adapted very progressively. In the case of abrupt modification, in particular abrupt jitter of the clock of the input stream, for example when switching to another input stream, the clock of the output stream keeps its regularity.

The device, just like any electronic device, has a reference clock. This reference clock affords counting of the time, it marks out clock ticks regularly. It is used in the method as a time reference.

Figure 3:
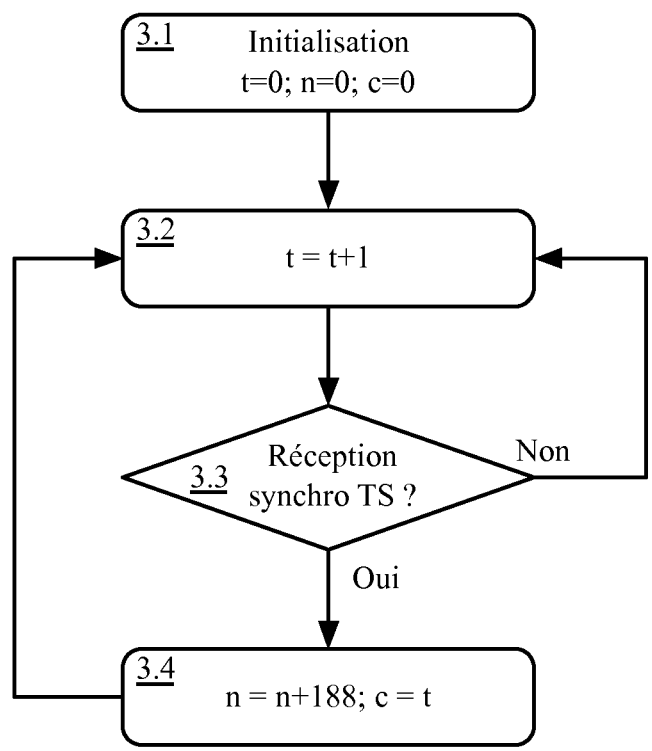
FIG. 3 illustrates the method of measuring the input rate.

The method of measuring the rate of the received stream is illustrated by FIG. 3. If the rate of the input stream is termed R, this rate can be expressed as a number of bytes received during a given time. This rate is calculated by accumulation in two counters called c for the counter serving to measure the time elapsed in the form of the number of ticks of the time-reference clock since the initialization of the process. The events of the packet clock of the received stream are termed TS synchro. They are therefore time events corresponding to the moment of reception of the first byte of a TS packet. These bytes have a defined value of 0×47 in hexa enabling them to be distinguished in the stream.

During a first initialization step 3.1, three counters are initialized to 0. A first counter t counts the time elapsed since this initialization. It is expressed as a number of clock ticks of the reference clock. A second counter n counts the number of bytes received. The third counter c is also a time counter in which the time elapsed during the reception of the bytes counted in the counter n is stored. This initialization step is advantageously performed when a TS synchro is received.

Next, a processing represented by steps 3.2, 3.3 and 3.4 is typically performed at each clock tick of the reference clock.

During step 3.2, the time counter t is updated.

During step 3.3, it is tested whether a TS synchro has been received since the first instant t−1. If the result of this test is negative, step 3.2 is looped back to for the following instant.

When a TS synchro has been received, step 3.4 of updating the counters n and c is performed. The counter n is incremented by a value corresponding to the byte size of a TS packet, typically 188. For this counter to be accurate when the step is first executed, advantageously the initialization step 3.1 is performed when a TS synchro is received.

It is noted that this method updates the counters n and c only when the first byte of a TS packet is received rather than when each byte is received. This updating is therefore done at the rate of the packet clock of the received stream. This packet clock is the same in the two transmission modes, burst and continuous, unlike the byte clock of the stream.

The measurement method therefore functions in the same way in these two transmission modes.

The rate that it is sought to measure R being equal to n/c. It is advantageously stored in the form of the two counters n and c, without making the division, for reasons of economy of computing resource.

The method being implemented continuously without reinitialization of the counters, the accumulation of the values c and n makes it possible to refine the ratio R over time.

When a switching of input stream is effected, the measurement is continued on the new stream received without reinitializing the counter so as to avoid a jump in the value of the rate.

Figure 4:
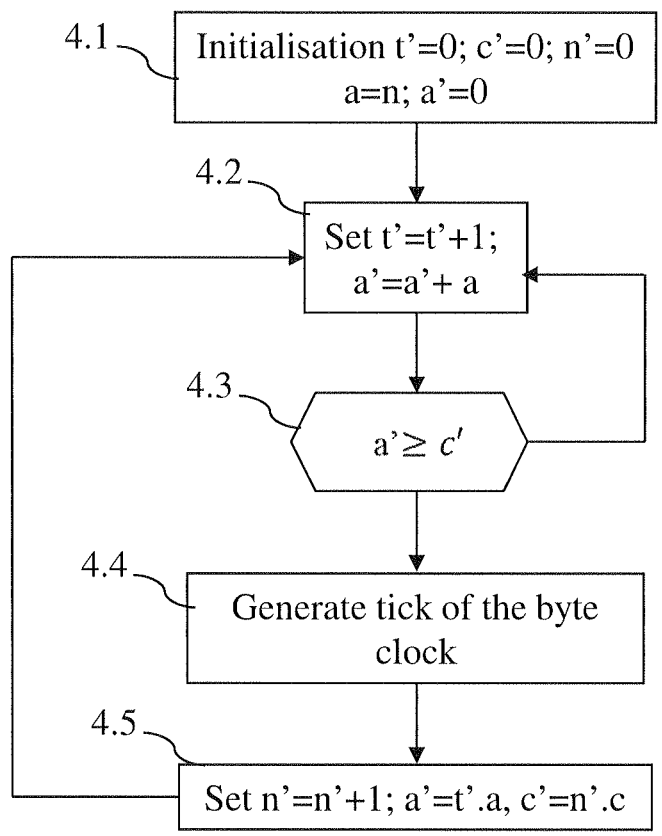
FIG. 4 illustrates the method of generating the clock of the output stream.

The method of generating the byte clock of the output stream is illustrated by FIG. 4. The method of generating the byte clock of the output stream is based on the comparison of two counters, the change in which is dependent on the rates of the input stream on the one hand and of the output stream on the other hand. The byte clock of the output stream that it is sought to generate is a subset of the reference time clock. The rate of the output stream corresponds at a given instant to the number of bytes sent divided by the time taken to transmit them. This rate has to correspond as well as possible to the input rate.

If the output time counter is called t', at an instant t', the number of bytes sent n' is equal to R'.t'. The following equivalence must therefore be complied with:

R=R' and therefore:

n/c=n'/t' or:

n.t'=n'.c

If c'=n'.c and a'=t'.n is posed, the equivalence between c' and a' for generating the clock of the output stream must be respected. Therefore the moment of sending a byte is generated when the quantity of data sent during the sending time becomes less than the quantity of data received during the reception time. A byte is therefore sent when the sending rate becomes less than the reception rate.

FIG. 4 illustrates a method calculating the output clock according to this principle.

During an initialization phase 4.1, the counters t', c' and n' defined above are set to zero. Use will also be made of an intermediate counter a that will keep the value of n during the last generation of a tick of the byte clock of the output stream called TS tick. This counter is initialized to the current value of n.

At each tick of the reference clock, the calculations corresponding to steps 4.2, 4.3, 4.4 and 4.5 are made according to the following mode.

During step 4.2, the clock counter t' is incremented by 1. This increment is transferred to the counter a', this counter being equal to t'.n, t' being incremented by 1, a' must be incremented by n and therefore a since a=n.

During step 4.3, the counter a' is compared with the counter c', if the counter a' has caught up or exceeded the counter c', it must generate a TS tick of the byte clock of the output stream and therefore the transmission of a byte of the output stream. Otherwise step 4.2 is looped back onto during the following tick of the reference clock.

The TS tick is generated during step 4.4. This is profited from to reinitialize the intermediate counter a to the current value of n.

The counters are then updated during step 4.5. The counter n' of the bytes sent is incremented by 1. The counter a' is reinitialized to the value t'.a, which corresponds to t'.n. The counter c' is reinitialized to the value n'.c. Step 4.2 is then looped back onto for the following tick of the reference clock.

In practice, the counters used are stored on a sufficient number of bits not to overflow over very long periods, typically of several years. In the example embodiment, 56-bit counters are used.

The method thus described makes it possible to generate a byte clock of the output stream from a calculated and continuously refined value of the rate of the input stream.

This value of the input rate being calculated on all the data received from the initialization of the method, it converges towards a stable value little affected by possible disturbances of the input stream. This being true even during switching of an input stream. In the case of total interruption of reception of the input stream, the data received can continue to be sent using the last calculated value of the input rate until the data received are exhausted. This is done by emptying the reception buffer and stopping the updating of the counters c and n. Other ways of calculating a value of the input rate continuously or generating the clock of the output stream from this calculated value of the rate of the input stream can be adopted without departing from the scope of the invention.

Figure 5:
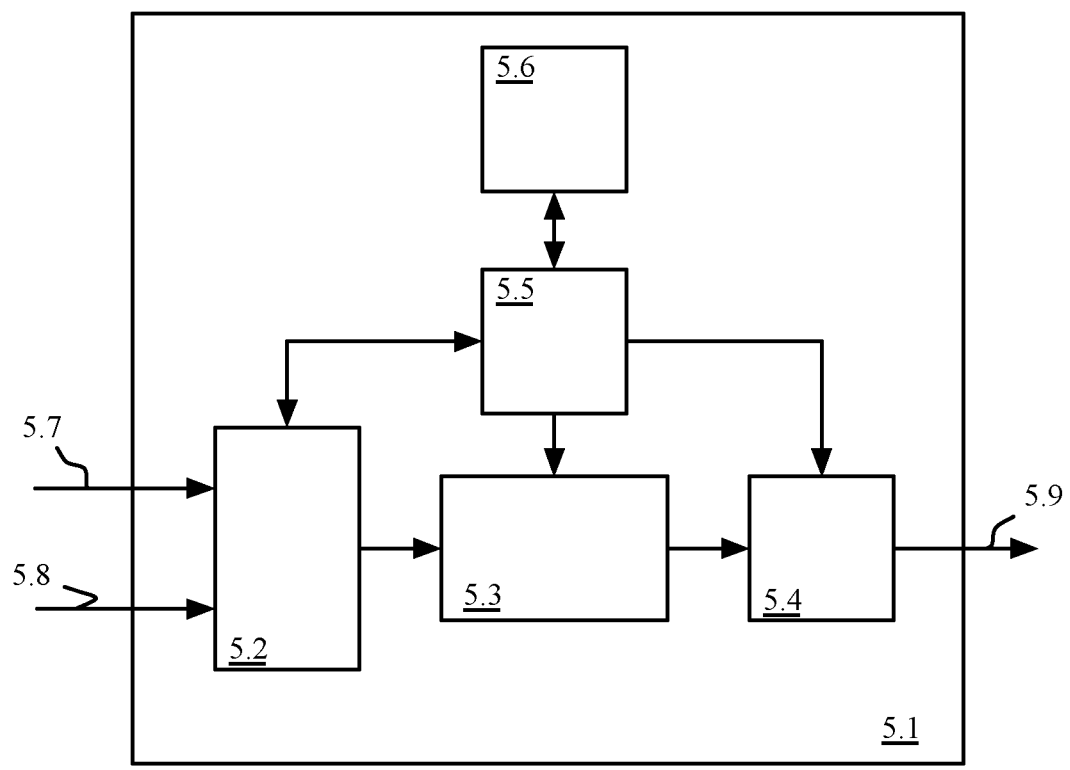
FIG. 5 illustrates an example of a device according to the invention.

FIG. 5 presents an example embodiment of the invention. This example is equipment used in the context of making a broadcasting network reliable. In these networks, it is usual to duplicate the distribution of a stream, for example by using two distribution networks. At the destination, two copies of the same stream are therefore received by two different ways. This ensures broadcasting even in the case of a problem on one of the distribution networks. The two copies of the stream 5.7 and 5.8 are at the input of the equipment. The module 5.2 manages the reception of the two streams and selects one of these streams in order to fill a buffer 5.3. The output stream 5.9 is generated by the generation module 5.4. The operations take place under the control of the processor 5.5 by means of programs recorded in the memory 5.6 of the equipment. It is in particular the processor 5.5 that will use the means of executing the methods previously described. The reference clock is here the operating clock of the processor 5.5. The reception module supplies the packet clock of the received stream selected. The processor 5.5 generates, according to the method described, the byte clock used by the generation module 5.4 in order to generate the output stream 5.9

This device is only one example embodiment of the invention, which can be used in any device that receives an input data stream and generates an output stream from this input stream that has to comply with the rate of the input stream.

The invention, although described in the context of an MPEG transport stream, can be adapted to other data streams sent at a substantially constant rate. In particularly, it is possible to use the byte clock of the input stream or any packet clock adapted to the format of the data of the input stream.

The invention claimed is:

1. A method of generating a clock of the moments of sending data packets of a data stream sent by a device, said device receiving at least a first stream of data as an input and sending a stream of data as an output, characterized in that it comprises:
    a step of measuring the transmission rate of the input stream received in a burst mode or in a continuous mode by counting the number of bytes received and by counting time taken to receive the bytes,
    step of counting the number of bytes sent and the time taken to send the bytes,
    a step of generating moments of sending the data packets of the stream sent at a different mode than the input stream, the moments being generated from the input transmission rate measured so as to comply with a sending transmission rate corresponding to the transmission rate of the input stream;
    and moments of sending the data packets is determined by comparing the product of the number of bytes received and of the time taken to send the bytes to the product of the time taken to receive the bytes and of the number of bytes sent.

2. A method according to claim 1, characterized in that the step of measuring the transmission rate of the input stream is performed by accumulation in two counters, a first counter accumulates the quantity of data received, the second counter accumulates the time elapsed for receiving these data.

3. A method according to claim 2, characterized in that, the input stream being composed of data packets themselves composed of bytes, said counters are updated when the first byte of a data packet is received.

4. A method according to claim 1, characterized in that the method comprises a step of generating the moment of sending a packet when the quantity of data sent during the sending time becomes less than the quantity of data received during the reception time.

5. A method according to claim 4, characterized in that the step of generating the moment of sending a packet comprises a step of comparing two counters, a first counter accumulating the number of bytes received multiplied by the sending time, a second counter accumulating the number of bytes sent multiplied by the reception time.

6. A device receiving at least one first data stream as an input and sending a data stream as an output, comprising means of generating a clock of the moments of sending data packets of a data stream sent by a device, said device being characterized in that these generation means comprise:
    means of measuring the transmission rate of the input stream received in a burst mode or in a continuous mode by counting the number of bytes received and by counting time taken to receive the bytes,
means of counting the number of bytes sent and the time taken to send the bytes,
means of generating the moments of sending the data packets of the stream sent at a different mode than the input stream, the moments being generated from the input transmission rate measured so as to comply with a transmission rate corresponding to the transmission rate of the input stream;
and moments of sending the data packets is determined by comparing the product of the number of bytes received and of the time taken to send the bytes to the product of the time taken to receive the bytes and of the number of bytes sent.

* * * * *